March 2, 1954     H. S. GILLESPIE     2,671,175
GENERATOR EQUALIZER CONTROL SYSTEM
Filed April 24, 1950
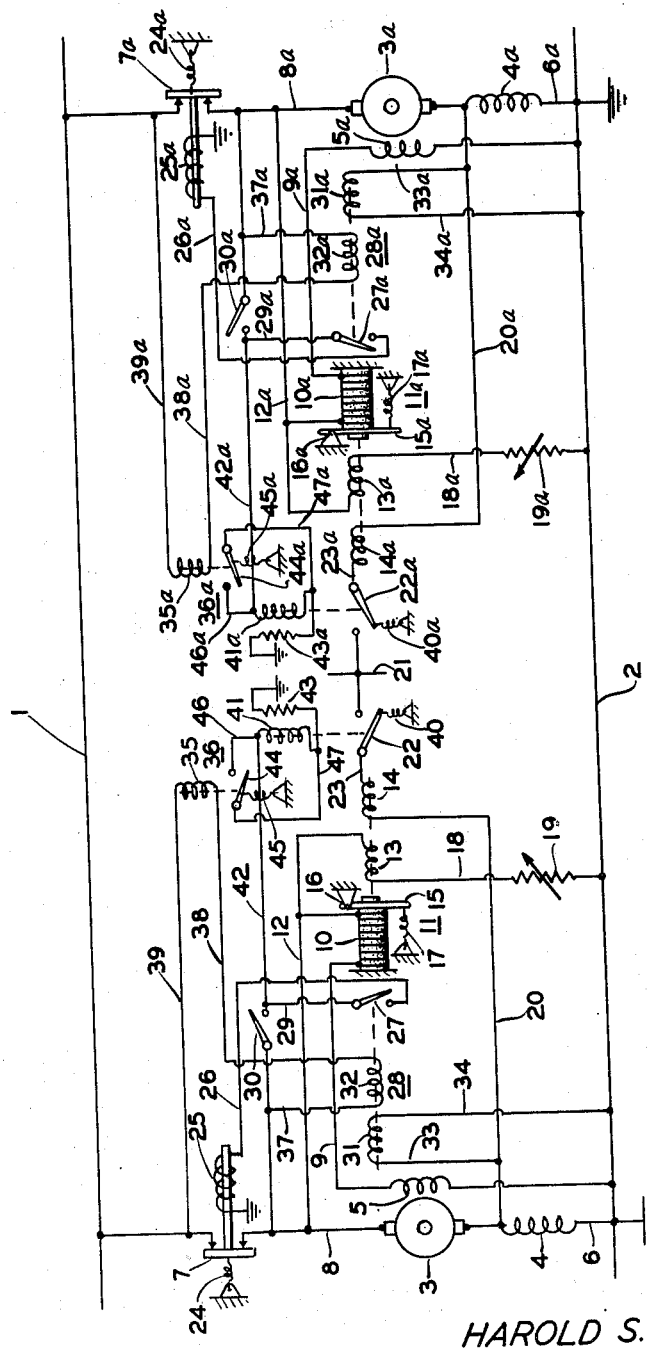
INVENTOR.
HAROLD S. GILLESPIE
BY James M. Nickels
ATTORNEY Patented Mar. 2, 1954

2,671,175

UNITED STATES PATENT OFFICE 2,671,175

GENERATOR EQUALIZER CONTROL SYSTEM

Harold S. Gillespie, Hasbrouck Heights, N. J., assignor to Bendix Aviation Corporation, Teterboro, N. J., a corporation of Delaware Application April 24, 1950, Serial No. 157,770

6 Claims. (Cl. 307—87)

The present invention relates to a generator control system and more particularly to a novel equalizer disconnect system.

In multi-generator D. C. aircraft generating systems, the conventional practice is to control the connection of the individual generators to the bus by means of a differential voltage and reverse current relay. One of the functions of the aforenoted relay is to energize the control circuit for the main contactor thereby to connect the generator to the bus, upon the generator voltage rising slightly above the bus voltage, say for example, ½ volt above the bus voltage. Another function is to deenergize the control circuit of the main contactor thereby disconnecting the generator from the bus, when the generator draws a predetermined amount of reverse current.

In order to bring the voltage of a generator above the bus voltage whose normally regulated voltage is the same as that of the bus voltage, it is necessary to connect the equalizer coil of the oncoming generator to the equalizer bus. Due to the difference in loads, the equalizer coil of the oncoming generator will tend to raise its voltage while the equalizer coils of the generators on the line will tend to depress the bus voltage thus permitting the oncoming generator voltage to rise sufficiently above the bus to actuate the differential voltage and reverse current relay to connect it to the bus.

Also, it is desirable to disconnect the equalizer coil of a generator going off the line as soon as possible in order that the bus voltage may rise to its normal value.

Heretofore, it has been the practice in some systems to connect and disconnect the equalizer coil by means of a relay responsive to generator voltage. A disadvantage of the aforenoted means for connecting the equalizer coil in the system is that the pick-up and drop-out voltages at which it is practical to operate the relay are such that the coil is connected in at a lower voltage than desired. For example, in a 28 volt system the relay closes when the generator voltage reaches approximately 22 volts. Also the drop-out voltage is lower than that desired, for example, 18 volts or lower. The lower the operating voltage of the relay, the longer time it is necessary to operate with the bus voltage depressed. In some instances, upon the generator going off the line due to reverse current but remaining at idling speed, the generator voltage will be above the drop-out value, hence the bus would operate continuously at a depressed voltage. The present invention provides a system for connecting the equalizer coil just before the generator goes on the line and disconnecting it immediately after the generator goes off the line. A relay which operates on differential voltage shorts out the operating coil of equalizer relay until the generator voltage nears that of the bus voltage.

It is an object of the invention to provide an improved generator control system.

Another object of the invention is to provide improved means for connecting and disconnecting the equalizer circuit in a generator system.

Another object of the invention is to provide means for connecting an equalizer winding into a generator system at near bus voltage.

Another object of the invention is to provide means for disconnecting the equalizer coil immediately upon the generator going off the line.

These and other objects and features of the invention will appear more fully hereinafter from a consideration of the following description taken in connection with the accompanying drawing wherein one embodiment of the invention is illustrated by way of example.

In the drawing:

The single figure is a schematic diagram of a generator and associated control circuits embodying one form of the invention.

Referring to the drawing, there are shown load lines or buses 1 and 2 adapted to be supplied by a plurality of generators which may be of any suitable type. By way of example, two generators 3 and 3a are shown which may be driven by any suitable means, such as an aircraft engine (not shown). It is understood, however, that any number of generators may be used.

The generator 3 has a series winding 4 and a shunt field winding 5. The winding 4 is connected in series with one output brush of the generator 3 and the bus 2 by a conductor 6. The other output brush of the generator 1 is connected to the bus 1 through a switch member 7 by a conductor 8. Leading from the shunt field winding 5 is a conductor 9 which in turn is connected to one end of a variable resistance carbon pile element 10 of a regulator 11. The other end of the carbon pile element 10 is connected by a conductor 12 to the output line 8.

Windings 13 and 14 provide electromagnetic means which are so arranged in the carbon pile regulator 11 as to control an armature 15 thereof and thereby the pressure applied to the carbon pile element 10. The regulator 11 is shown diagrammatically in Figure 1 as including the armature 15 pivoted at 16 and exerting a compressive force upon the carbon pile 10 under tension of a spring 17. The spring 17 is arranged so as to balance the pull on the armature 15 by the windings 13 and 14 for a predetermined output voltage. One end of the winding 13 is connected to the conductor 12. The other end of the winding 13 is connected by a conductor 18 to the output line 6. In order to permit adjustment, a variable resistor 19 is inserted in the conductor 18.

One end of the winding 14 is connected by a conductor 20 to the same output brush of generator 3 as the series winding 4. The other end of the winding 14 is connected to an equalizer bus 21 through a switch member 22 by conductor 23.

The switch 7 is normally biased in an open circuit position by spring 24 and is actuated to a closed position by electromagnetic winding 25. One end of the winding 25 is connected to ground. The other end of the winding 25 is connected by conductor 26 to one contact of a switch member 27 of a differential voltage and reverse current relay 28. The other contact of the switch member 27 is connected by a conductor 29 to the output line 8. A manual switch 30 may be inserted in the conductor 29.

The relay 28 is of the polarized magnetic latching type and is controlled by the electromagnetic windings 31 and 32. One end of the winding 31 is connected by a conductor 33 to the conductor 23. The other end of the winding 31 is connected to conductor 34 to the bus 2 and is so arranged to actuate the switch member 27 to an open position when the reverse current flowing in the generator 3 exceeds a predetermined amount.

The winding 32 is connected across the switch contacts of switch 7 in series with winding 35 of relay 36 by conductors 37, 38 and 39, and is so arranged to actuate the switch member 27 to a closed position when the generator voltage is greater than the line voltage by a predetermined amount.

The switch member 22 is biased by spring 40 towards a circuit-open position and is actuated and held in a closed position by electromagnetic winding 41. One end of the winding 41 is connected by conductor 42 to the conductor 29 which in turn is connected to the output conductor 8. The other end of the winding 41 is connected to ground through resistor 43. The winding 41 is arranged so as to actuate the switch member 22 to a closed position upon the generator voltage reaching a predetermined value.

The winding 35 of relay 36 is so arranged to actuate switch member 44 to a closed position upon the voltage of the generator differing from the voltage of the line by a predetermined amount of a given polarity. The switch member is normally biased to an open circuit position by a spring 45. One contact of the switch member 44 is connected by a conductor 46 to one end of the winding 41 and the other contact of the member 44 is connected by conductor 47 to the other end of the winding 41 so that when the switch member 44 is in the closed position, the winding 41 is short-circuited.

Likewise, the generator 3a has a series winding 4a and a shunt winding 5a and is connected to the buses 1 and 2 in the same manner as the generator 3. Parts in the generator 3a have been given the same reference numerals, with the letter "a" added, to distinguish therefrom as the corresponding parts in the generator 3. Inasmuch as the two are similar, a detailed description of the generator 3a will be omitted.

In operation, the winding 41 responsive to generator voltage actuates the switch contact 22 to connect and disconnect the equalizer winding 14 in the system. However, the winding 41 is subject to the control of the relay 36 which short-circuits the winding 41 when the generator voltage is a predetermined amount below the bus voltage. The relay 36 is polarized and operates on differential voltage.

When the generator voltage is building up and approaches the bus voltage within, for example, approximately 0.7 volt, the spring 45 overcomes the bias of the relay 36 and opens the contact 44 to remove the short circuit from the winding 41 which then actuates the switch 22 to connect the equalizer circuit in the system. Upon the bus being loaded, the equalizer circuit will cause the regulator 11 to boost the voltage of the oncoming generator 3 sufficiently above bus voltage to operate the differential voltage reverse current relay and connect the generator 3 to the bus.

Whenever the generator voltage drops a predetermined amount below the bus voltage, for example, 1 volt, such as just after a reverse current opening, the relay 36 overcomes the bias of the spring 45 and closes the switch member 44 thereby shorting out the winding 41 to open the equalizer circuit.

Although only one embodiment of the invention has been illustrated and described, various changes in the form and relative arrangements of the parts may be made to suit requirements.

What is claimed is:

1. In combination, a load circuit, a plurality of generators for said load circuit, voltage regulating means associated with each of said generators, relay means associated with at least one generator for connecting said generator into the load circuit upon the generated current of said generator exceeding the load current by a predetermined value, said regulators arranged so as to maintain a predetermined generator voltage, means including an equalizer circuit for varying the voltage setting of each regulator so as to decrease the voltage setting of the regulating means of the generators connected to the load circuit and increase the voltage setting of the regulating means of said one generator when disconnected from the load circuit so that said relay means may effect the connection thereof to said load circuit, and polarized differential relay means for disconnecting said last means from said one generator upon the voltage of said generator being below the voltage of said load circuit by a predetermined amount.

2. In combination, a main output line, a plurality of generators, each of said generators having an output voltage regulator, reverse current and differential voltage relay means for controlling the connection of the associated generator to said output line, an equalizer circuit associated with said regulators so as to maintain a predetermined division of load between said generators, equalizer disconnect relay means responsive to the voltage of the associated generator for controlling the connection of said regulator to said equalizer circuit, and means responsive to the difference in voltage between said associated generator and said output line to shunt said equalizer disconnect relay means upon said difference in voltage exceeding a predetermined amount in a predetermined direction.

3. In combination, a main output line, a plurality of generators, each of said generators having a field circuit, an output voltage regulator including an equalizer winding, an equalizer bus for interconnecting the associated equalizer windings, first relay means to control the connection of the associated generator to the main output line and including a reverse current winding and a differential voltage winding, second relay means responsive to the voltage of said associated generator to effect the connection of said equalizer winding to said bus, and third relay means responsive to the difference in voltage between said associated generator and said output line to disable said second relay means upon said difference exceeding a predetermined amount.

4. Apparatus for use in controlling the connection of a generator to a load circuit in a multiple generator system, each generator having a regulator associated therewith including an equalizer winding, electrical circuit means for interconnecting the equalizer windings, comprising means connectable to be responsive to generator voltage to connect said equalizer winding to said bus and relay means responsive to the difference in voltage between generator voltage and the load circuit to control the connection of said last means.

5. Apparatus for use in controlling the connection of a generator to a load circuit in a multiple generator system having means for maintaining a predetermined division of load including a regulator having an equalizer winding associated therewith for each generator, comprising first relay means responsive to the voltage of the associated generator for connecting said equalizer winding to said load determining means, second relay means responsive to the differential in voltage between said generator and said system for controlling the connection of said generator to said load circuit, and third relay means responsive to said differential in voltage for short circuiting said first relay means upon said differential in voltage exceeding a predetermined value.

6. Apparatus for use in controlling the connection of a generator to an output circuit of a multiple generator system having voltage regulating means associated with each of said generators and an equalizer circuit for varying the voltage setting of each regulator so as to decrease the voltage setting of the regulating means of the generators connected to the load circuit and increase the voltage setting of the regulating means of the generator disconnected from the load circuit, comprising first relay means normally biased to an open circuit position and responsive to the generated voltage of said disconnected generator to overcome said bias and actuate said first relay means to a closed circuit position to connect the associated regulator to said equalizer circuit, second relay means responsive to the difference in voltage between said disconnected generator and said output circuit to short circuit said first relay means upon said difference exceeding a predetermined amount, and third relay means for connecting said generator to said output circuit upon the voltage of said generator exceeding the voltage of said output circuit by a predetermined amount.

HAROLD S. GILLESPIE.

References Cited in the file of this patent

UNITED STATES PATENTS

| Number | Name | Date |
|---|---|---|
| 2,401,795 | Rady | June 11, 1946 |
| 2,483,117 | Almassy | Sept. 27, 1949 |
| 2,494,397 | Lusk | Jan. 10, 1950 |